(12) United States Patent
Bao et al.

(10) Patent No.: US 11,841,549 B2
(45) Date of Patent: Dec. 12, 2023

(54) WIDE-ANGLE LENS

(71) Applicant: JIANGXI LIANCHUANG ELECTRONIC CO., LTD., Nanchang (CN)

(72) Inventors: Yumin Bao, Nanchang (CN); Weijian Chen, Nanchang (CN); Xuming Liu, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 794 days.

(21) Appl. No.: 16/986,211

(22) Filed: Aug. 5, 2020

(65) Prior Publication Data

US 2020/0363609 A1 Nov. 19, 2020

Related U.S. Application Data

(63) Continuation of application No. PCT/CN2019/085183, filed on Apr. 30, 2019.

(30) Foreign Application Priority Data

May 31, 2018 (CN) .......................... 201810549888.2

(51) Int. Cl.
*G02B 9/10* (2006.01)
*G02B 13/18* (2006.01)

(52) U.S. Cl.
CPC ............... *G02B 9/10* (2013.01); *G02B 13/18* (2013.01)

(58) Field of Classification Search
CPC . G02B 9/10; G02B 13/18; G02B 9/64; G02B 13/0045; G02B 13/06
See application file for complete search history.

(56) References Cited

U.S. PATENT DOCUMENTS

| | | | | |
|---|---|---|---|---|
| 6,014,268 A | * | 1/2000 | Yahagi | G02B 15/177 359/691 |
| 2007/0139787 A1 | * | 6/2007 | Kim | G02B 15/143507 359/680 |
| 2015/0260968 A1 | * | 9/2015 | Ohashi | G02B 7/028 359/684 |
| 2016/0363740 A1 | * | 12/2016 | Gong | G02B 13/0045 |

* cited by examiner

*Primary Examiner* — Marin Pichler
*Assistant Examiner* — Justin W. Hustoft

(57) ABSTRACT

The present disclosure provides a wide-angle lens, including a first lens group having a negative focal power, a second lens group having a positive focal power, and an aperture stop disposed between the first lens group and the second lens group. The first lens group, from the object side to the imaging surface, sequentially includes a meniscus-shaped first lens having a negative focal power, a second lens having a negative focal power, and a third lens having a positive focal power. A concave surface of the first lens faces the imaging surface, and a concave surface of the second lens faces the imaging surface.

15 Claims, 8 Drawing Sheets

WIDE-ANGLE LENS

CROSS REFERENCE TO RELATED APPLICATION(S)

This application is a continuation of International Application No. PCT/CN2019/085183, filed on Apr. 30, 2019, which claims the priority benefit of a Chinese Patent Application No. 2018105498882, filed on May 31, 2018. The entireties of the above-mentioned applications are hereby incorporated by reference herein.

TECHNICAL FIELD

The present disclosure relates to a technical filed of cameras, in particular to a wide-angle lens.

BACKGROUND

With development of automatic driving functions, a wide-angle lens such as a vehicle-mounted lens, which serves as a key component of automatic driving assistant system, has developed rapidly, and requirements for the wide-angle lens also become higher.

Compared with an ordinary optical lens, the vehicle-mounted lens in the automatic driving assistant system has special requirements. For example, the vehicle-mounted lens requires a front port diameter to be as small as possible, a strong light transmission capability, and requires the vehicle-mounted lens to be able to adapt to light and darkness changes of an external environment, and accordingly has a high imaging clarity, such that the vehicle-mounted lens is able to effectively distinguish details of the external environment (such as highway signs, distant pedestrians and vehicles, etc.). Additionally, thermal stability of the vehicle-mounted lens should be nice, so that the vehicle-mounted lens has a good resolution at both high and low temperatures. Then the special requirements of automatic driving are satisfied.

However, most existing vehicle-mounted lenses are sensitive to changes of temperature, which is difficult to be used in a high-temperature environment or a low-temperature environment. In addition, the resolution of the existing vehicle-mounted lens in the high-temperature environment or the low-temperature environment is low, and is difficult to eliminate chromatic aberrations, resulting in blurred imaging, which is not conducive to practical applications.

SUMMARY

Based on this, an object of the present disclosure is to provide a wide-angle lens with high resolution in high and low temperature environments.

The present disclosure provides a wide-angle lens. From an object side to an imaging surface, the wide-angle lens sequentially includes: a first lens group having a negative focal power, a second lens group having a positive focal power, and an aperture stop disposed between the first lens group and the second lens group. The first lens group, from the object side to the imaging surface, sequentially includes a meniscus-shaped first lens having a negative focal power, a second lens having a negative focal power, and a third lens having a positive focal power. A concave surface of the first lens faces the imaging surface, and a concave surface of the second lens faces the imaging surface. The second lens group, from the object side to the imaging surface, sequentially includes a fourth lens having a positive focal power, a fifth lens having a positive focal power, a sixth lens having a negative focal power, and a seventh lens having a positive focal power. The fourth lens, the fifth lens, and the seventh lens are biconvex lenses, and the sixth lens is a biconcave lens. The fifth lens and the sixth lens are cemented a cemented lens. The first lens, the third lens, the fourth lens, the fifth lens, and the sixth lens are all glass spherical lenses. The second lens and the seventh lens are glass aspherical lenses, and optical center bits of the lenses in the first lens group and the second lens group are located on a same straight line.

Compared with the prior art, the present disclosure provides the wide-angle lens, making the fifth lens and the sixth lens to cement the cemented lens. The combined wide-angle lens is clearly imaged in a temperature ranges from −40° C. to +85° C. through adopting a combined structure of five glass spherical lenses and two glass aspherical lenses and reasonable focal power matching, therefore, wide-angle characteristic is satisfied, and the high resolution is kept in both high and low temperature environments.

Furthermore, the wide-angle lens satisfies the following expression: $-0.85<\varphi_2/y_7<-0.6$, wherein $\varphi_2$ represents a refractive power of the second lens, and $\omega_7$ represents a refractive power of the seventh lens. The expression indicates that spherical aberration formed by the second lens and the seventh lens cancel each other, which is able to effectively improve an analysis force of the wide-angle lens.

Furthermore, the wide-angle lens satisfies the following expression: $-5.5<(dN/dT)_5+(dN/dT)_6<-4.5$, wherein $(dN/dT)_5$ represents a temperature coefficient of refractive index of the fifth lens, and $(dN/dT)_6$ represents a temperature coefficient of refractive index of the sixth lens. The expression indicates that the fifth lens and the sixth lens effectively compensate influences of temperature changes on a focal length of the wide-angle lens, which further improves stability of the analysis force of the wide-angle lens at different temperatures.

Furthermore, the wide-angle lens satisfies the following expression: $-15.5<(dN/dT)_2+(dN/dT)_7<-8.0$, wherein $(dN/dT)_2$ represents a temperature coefficient of refractive index of the second lens, and $(dN/dT)_7$ represents a temperature coefficient of refractive index of the seventh lens. When this expression is satisfied, sensitivity of the wide-angle lens to the temperature is effectively reduced, and the stability of the analysis force of the wide-angle lens at different temperatures is further improved.

Furthermore, the wide-angle lens satisfies the following expression: $-0.45<\varphi_5/\varphi_6<-0.2$, wherein $\varphi_5$ represents a refractive power of the fifth lens, and $\varphi_6$ represents a refractive power of the sixth lens. When this expression is satisfied, color difference of the wide-angle lens can be effectively corrected, and the analysis force of the wide-angle lens is further improved.

Furthermore, the wide-angle lens satisfies the following expression: $-0.63<\varphi_{II}/\varphi<-0.42$, wherein $\varphi_{II}$ represents a combined refractive power of the second lens group, and $\varphi$ represents a refractive power of the wide-angle lens. When this expression is satisfied, astigmatism of the wide-angle lens can be effectively corrected, and the analysis force of the wide-angle lens is further improved.

Furthermore, the wide-angle lens satisfies the following expression: $0.95<|IH/(f*\theta)|<1$, wherein $\theta$ represents a maximum half-field angle of the wide-angle lens (representing as radians), IH represents an image height of the wide-angle lens when the half field angle is $\theta$, and f represents an effective focal length of the wide-angle lens. This expression indicates radio of an actual image height of the wide-angle lens to an ideal image height of the wide-angle lens.

Furthermore, the wide-angle lens satisfies the following expressions: $D_1>D_2>D_3$, where $D_1$ represents the maximum diameter of the first lens, $D_2$ represents the maximum diameter of the second lens, $D_3$ represents the maximum diameter of the third lens.

Furthermore, the wide-angle lens satisfies the following expression: $1<T_5/T_7<2$, wherein $T_5$ represents the thickness of the fifth lens, $T_7$ represents the thickness of the seventh lens.

Furthermore, the wide-angle: lens satisfies the following expressions: $d_{12}>d_{34}>d_{67}$, wherein $d_{12}$ represents the distance between the first lens and the second lens on the optical axis, $d_{34}$ represents the distance between the third lens and the fourth lens on the optical axis, $d_{67}$ represents the distance between the sixth lens and the seventh lens on the optical axis.

Furthermore, the wide-angle lens satisfies the following expression: $-8<R_9/R_{10}<-2$, wherein $R_9$ represents a radius of curvature of an object side surface of the fourth lens, $R_{10}$ represents a radius of curvature of an image side surface of the fourth lens.

Furthermore, the wide-angle lens satisfies the following expression: $0,3<R_3/R_5<1$, wherein $R_3$ represents a radius of curvature of an image side surface of the first lens, $R_5$ represents a radius of curvature of an image side surface of the second lens.

Furthermore, the wide-angle lens satisfies the following expression: $3<R_2/R_3<5$, wherein $R_2$ represents a radius of curvature of an object side surface of the first lens, $R_3$ represents a radius of curvature of an image side surface of the first lens.

Furthermore, surface shapes of the second lens and the seventh lens satisfy the following formula:

$$z = \frac{ch^2}{1+\sqrt{1-(1+K)c^2h^2}} + Bh^4 + Ch^6 + Dh^8 + Eh^{10} + Fh^{12},$$

wherein z represents a distance of a curved surface of the second lens or the seventh lens leaving away from a vertex of the curved surface in optical axis direction, c represents a curvature of the vertex of the curved surface, K represents a quadratic surface coefficient, h represents a distance from the optical axis to the curved surface, B, C, D, E, and F respectively represent a fourth order curve coefficient, a sixth order curve coefficient, an eighth order curve coefficient, a tenth order curve coefficient, and a twelfth order curve coefficient.

Compared with the prior art, the wide-angle lens at least has following advantages:
(1) The wide-angle lens adopts seven glass lenses, which is clearly imaged in the temperature range from −40° C. to +85° C. and is particularly suitable for camera fields such as motion cameras, vehicle-mounted cameras, which are used in a harsh environment.
(2) The wide-angle lens is clearly imaged through reasonable configuration of focal power combinations between the lenses, which can match with imaging chips with more than eight million pixels.
(3) A field angle of the wide-angle lens can reach 146 degrees, distortion of f-θ is effectively corrected, and the distortion of f-θ is controlled to be less than 5% thus, requirements of a large field angle are satisfied.

(4) An aperture number of the wide-angle lens is 1.8, which satisfies an imaging requirement of a darker environment.

Figure 1:
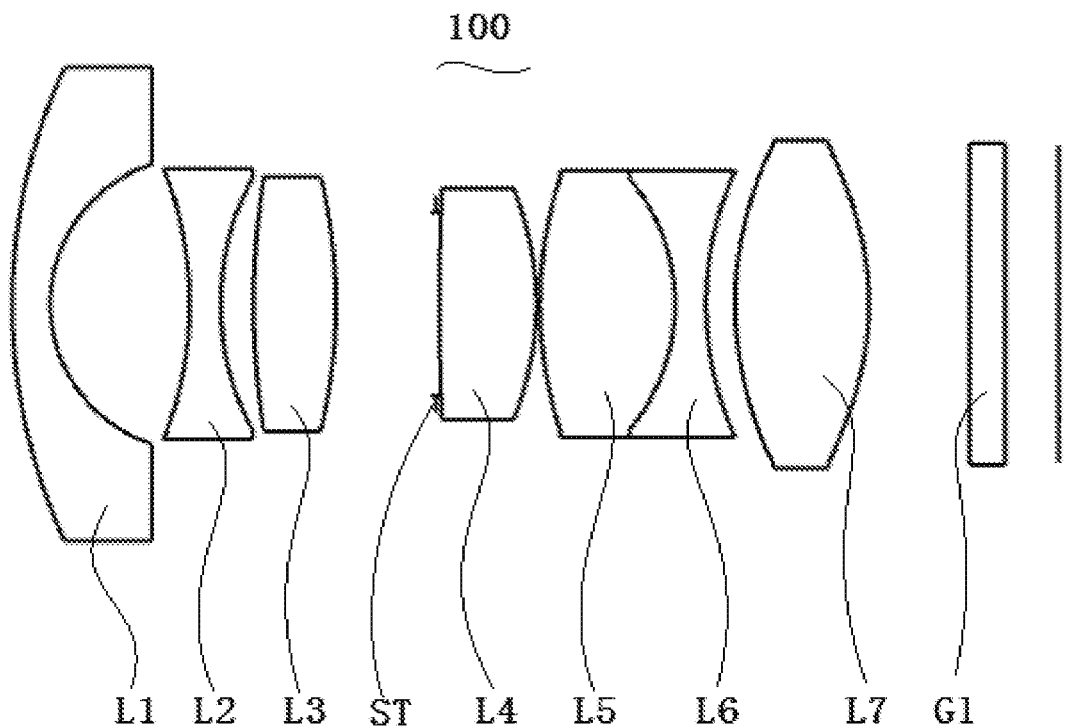
FIG. 1 is a schematic cross-sectional structural diagram of a wide-angle lens according to a first embodiment of the present disclosure.

Reference numerals of main components:

| Wide-angle lens | 100 | Aperture stop | ST |
| First lens | L1 | Second lens | L2 |
| Third lens | L3 | Fifth lens | L5 |
| Fourth lens | L4 | Seventh lens | L7 |
| Sixth lens | L6 | Optical filter | G1 |

The present disclosure is further illustrated by the following detailed description in combination with the accompanying drawings.

DETAILED DESCRIPTION

The specific embodiments of the present disclosure are described in detail below with reference to the accompanying drawings. Several embodiments of the present disclosure are presented in the drawings. However, the disclosure may be embodied in many different forms and is not limited to the embodiments described herein. Rather, these embodiments are provided so that this disclosure is thorough comprehensive.

Unless defined otherwise, all technical and scientific terms used herein have the same meaning as commonly understood by one of ordinary skill in the art to which the present disclosure belongs. The terminology used herein in the description of the present disclosure is for the purpose of describing particular embodiments only and is not intended to limit the present disclosure. As used herein, the term "and/or" includes any and all combinations of one or more of the associated listed items.

Embodiment 1

Referring to FIG. 1, FIG. 1 is a structural diagram of a wide-angle lens 100 according to a first embodiment of the present disclosure. The wide-angle lens 100, from an object side to an imaging surface, includes a first lens group having a negative focal power, a second lens group having a positive focal power, and an aperture stop ST disposed between the first lens group and the second lens group.

Specifically, the first lens group, from the object side to the imaging surface, sequentially includes a meniscus-shaped first lens L1 having a negative focal power, a second lens L2 having a negative focal power, and a third lens L3 having a positive focal power. A concave surface of the first lens faces the imaging surface, and a concave surface of the second lens faces the imaging surface. The second lens group, from the object side to the imaging surface, sequentially includes a fourth lens L4 having a positive focal power, a fifth lens L5 having a positive focal power, a sixth lens L6 having a negative focal power, and a seventh lens L7 having a positive focal power. The fourth lens L4, the fifth lens L5, and the seventh lens L7 are biconvex lenses; and the sixth lens L6 is a biconcave lens. The fifth lens L5 and the sixth lens L6 are cemented a cemented lens. The first lens L1, the third lens L3, the fourth lens L4, the fifth lens L5, and the sixth lens L6 are glass spherical lenses. The second lens L2 and the seventh lens L7 are glass aspherical lenses, and optical center bits of the lenses in the first lens group and the second lens group are all located on a same straight line.

The present disclosure provides the wide-angle lens, making the fifth lens L5 and the sixth lens L6 to cement the cemented lens. The first lens L1, the third lens L3, the fourth lens L4, the fifth lens L5, and the sixth lens L6 are prepared by using the glass spherical lenses. At the same time, the second lens L2 and the seventh lens L7 are prepared by using the glass aspherical lenses. The combined wide-angle lens 100 is clearly imaged in a temperature ranges from −40° C. to +85° C. through combination of each lens and reasonably setting focal power of each lens, therefore, wide-angle characteristic is satisfied, and the high resolution is kept in both high and low temperature environments.

Specifically, in one embodiment, surface shapes of the second lens and the seventh lens satisfy the following formula:

$$z = \frac{ch^2}{1 + \sqrt{1-(1+K)c^2h^2}} + Bh^4 + Ch^6 + Dh^8 + Eh^{10} + Fh^{12},$$

wherein z represents a distance of a curved surface of the second lens or the seventh lens leaving away from a vertex of the curved surface in optical axis direction, c represents a curvature of the vertex of the curved surface, K represents a quadratic surface coefficient, h represents a distance from the optical axis to the curved surface, B, C, D, E, and F respectively represent a fourth order curve coefficient, a sixth order curve coefficient, an eighth order curve coefficient, a tenth order curve coefficient, and a twelfth order curve coefficient.

In the following different embodiments, relevant parameters of each lens of the wide-angle lens 100 are referred to parameter tables of the various embodiments.

Referring to FIG. 1, which is the wide-angle lens 100 provided in the first embodiment of the present disclosure, the relevant parameters of each lens in the wide-angle lens 100 are shown in Tables 1 -1 to 1-2.

TABLE 1-1

|  | Surface number | Surface type | Curvature radius-r | Thickness-d | Refractive index-Nd | Abbe number-Vd |
| --- | --- | --- | --- | --- | --- | --- |
| Subject to be shot | 1 | Spherical surface | — | Infinity |  |  |
| First lens | 2 | Spherical surface | 14.451 | 0.979 | 1.911 | 35.3 |
|  | 3 | Spherical surface | 3.798 | 3.597 |  |  |
| Second lens | 4 | Aspherical surface | −8.324 | 0.798 | 1.433 | 94.8 |
|  | 5 | Aspherical surface | 7.810 | 0.848 |  |  |
| Third lens | 6 | Spherical surface | 20.625 | 2.117 | 1.904 | 31.4 |
|  | 7 | Spherical surface | −13.682 | 2.575 |  |  |
| Aperture stop | 8 | Spherical surface | — | 0.093 |  |  |
| Fourth lens | 9 | Spherical surface | 61.748 | 2.492 | 1.697 | 55.5 |
|  | 10 | Spherical surface | −7.840 | 0.099 |  |  |
| Fifth lens | 11 | Spherical surface | 10.398 | 3.478 | 1.593 | 68.5 |

TABLE 1-1-continued

| | Surface number | Surface type | Curvature radius-r | Thickness-d | Refractive index-Nd | Abbe number-Vd |
|---|---|---|---|---|---|---|
| Sixth lens | 13 | Spherical surface | −5.061 | 0.800 | 1.762 | 26.6 |
| | 14 | Spherical surface | 8.170 | 0.747 | | |
| Seventh lens | 15 | Aspherical surface | 8.184 | 3.452 | 1.566 | 71.3 |
| | 16 | Aspherical surface | −7.616 | 0.30 | | |
| Optical filter | 17 | Spherical surface | | 0.400 | 1.517 | 64.21 |
| | 18 | Spherical surface | — | 3.125 | | |
| Flat Glass | 19 | Spherical surface | — | 0.50 | 1.517 | 64.21 |
| | 20 | Spherical surface | | 0.57 | | |
| Imaging surface | 21 | Spherical surface | — | — | | |

TABLE 1-2

| Surface number | K | B | C | D | E | F |
|---|---|---|---|---|---|---|
| 4 | 0 | 2.207e−3 | −3.016e−4 | 2.472e−5 | −1.176e−6 | 2.093e−8 |
| 5 | −1.785 | 3.264e−3 | −3.616e−4 | 3.318e−5 | 1.892e−6 | 4.638e−8 |
| 15 | 0.508 | −1.033e−3 | 4.246e−5 | −3.607e−6 | 2.243e−7 | −3.651e−9 |
| 16 | 0.500 | 6.032e−4 | −2.078e−5 | 4.484e−6 | −3.126e−7 | 1.008e−8 |

Figure 2:
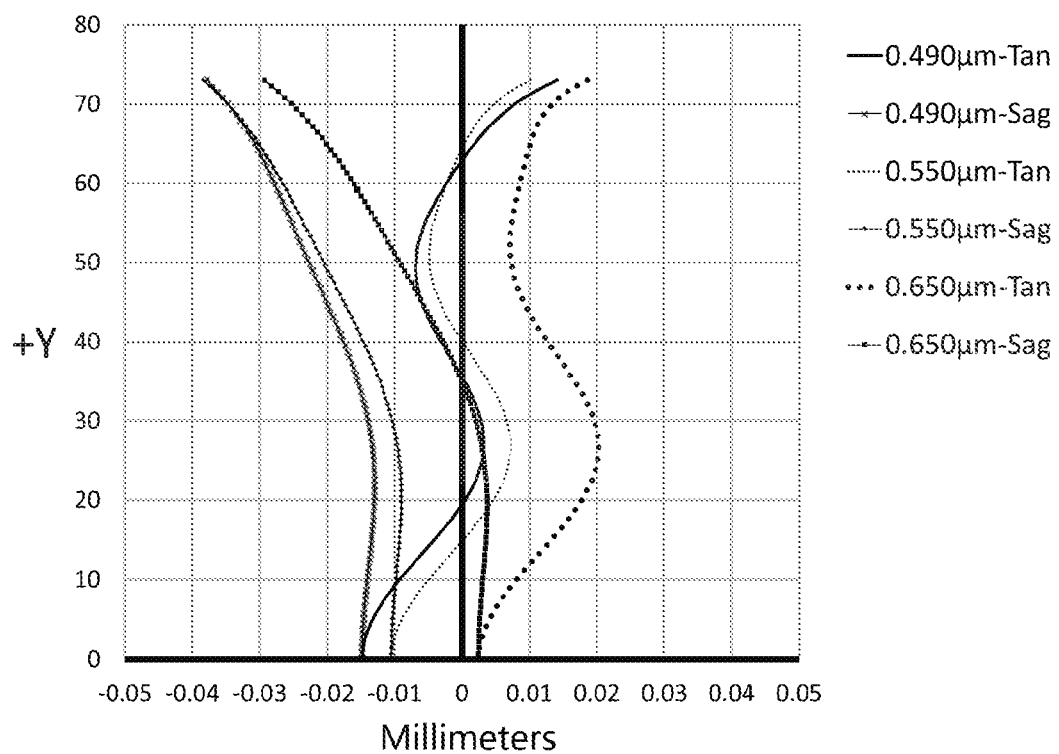
FIG. 2 is a curve diagram of a field curve of the wide-angle lens according to the first embodiment of the present disclosure.
Figure 3:
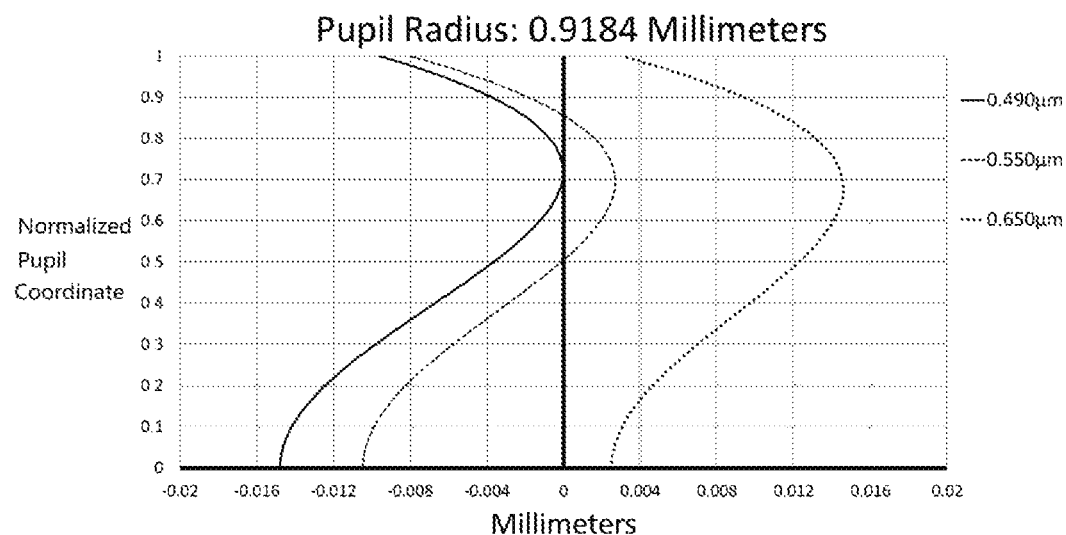
FIG. 3 is a curve diagram of axial aberration of the wide-angle lens according to the first embodiment of the present disclosure.
Figure 4:
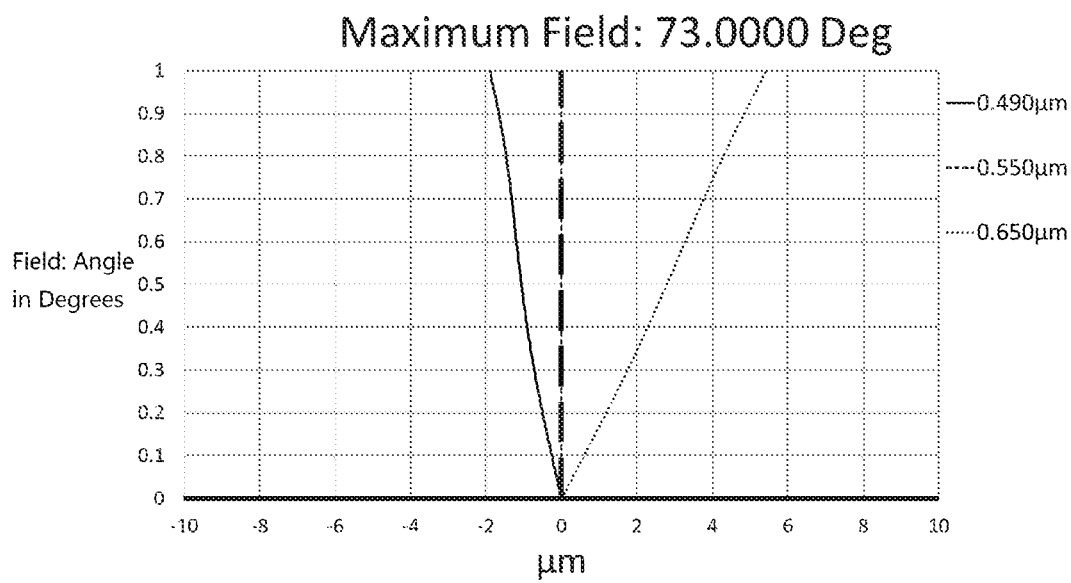
FIG. 4 is a curve diagram of vertical axis color difference of the wide-angle lens according to the first embodiment of the present disclosure.

In one embodiment, a field curve, axial aberration and vertical axis color difference of the wide-angle lens 100 are respectively shown in FIGS. 2, 3, and 4. It can be seen that the field curve is in the range of (−0.05, +0.05), the axial aberration is in the range of (−0.02,+0.02), and the vertical axis color difference is in the range of (−2.0,+10.0), which indicates that the field curve, aberration, and color difference is well corrected in one embodiment.

Embodiment 2

Figure 5:
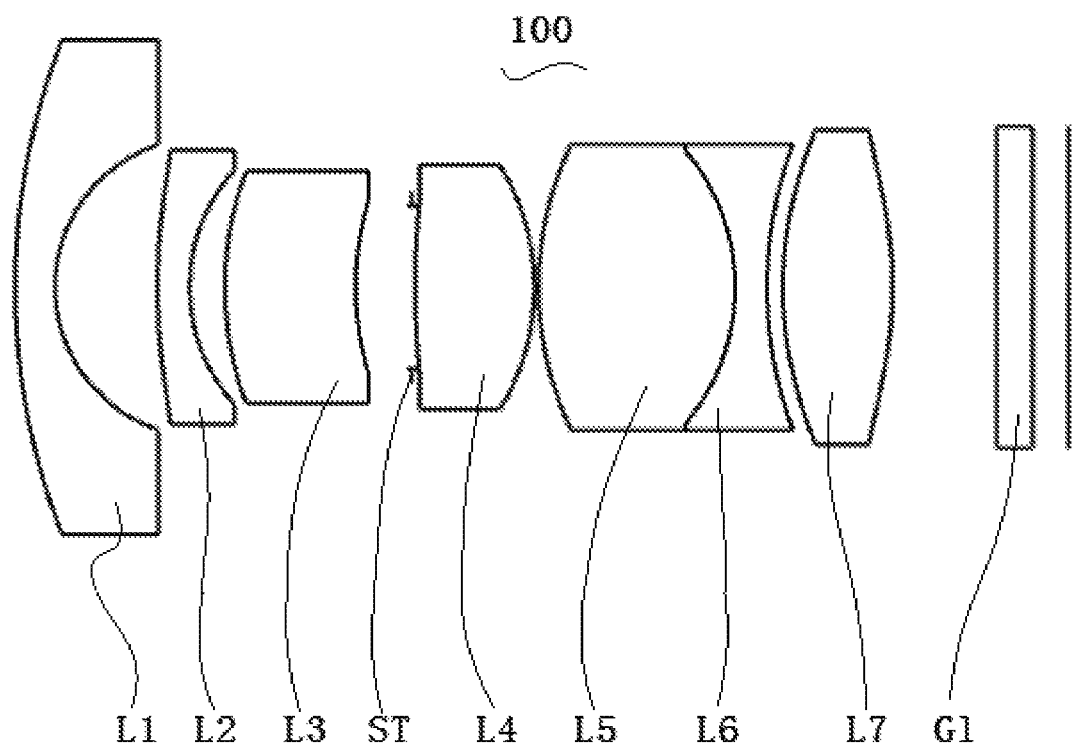
FIG. 5 is a schematic cross-sectional structural diagram of a wide-angle lens according to a second embodiment of the present disclosure.

Referring to FIG. 5, which is a structural diagram of the wide-angle lens 100 provided in a second embodiment of the present disclosure and is substantially the same as a structure of the lens of embodiment 1, except that: (1) An object side surface of the second lens L2 is a convex surface, an image side surface of the second lens L2 is a concave surface. An object side surface of the third lens L3 is a convex surface, an image side surface of the third lens L3 is a concave surface; (2) the related parameters of each lens in the wide-angle lens of the embodiment are different, as shown in Table 2-1, and the parameters of each lens of spherical surfaces of one embodiment are shown in Table 2-2.

TABLE 2-1

| | Surface number | Surface type | Curvature radius-r | Thickness-d | Refractive index-Nd | Abbe number-Vd |
|---|---|---|---|---|---|---|
| Subject to be shot | 1 | Spherical surface | — | Infinity | | |
| First lens | 2 | Spherical surface | 16.912 | 1.000 | 1.788 | 47.5 |
| | 3 | Spherical surface | 3.768 | 2.580 | | |
| Second lens | 4 | Aspherical surface | 22.619 | 0.800 | 1.495 | 80.7 |

TABLE 2-1-continued

|  | Surface number | Surface type | Curvature radius-r | Thickness-d | Refractive index-Nd | Abbe number-Vd |
|---|---|---|---|---|---|---|
|  | 5 | Aspherical surface | 4.875 | 0.879 |  |  |
| Third lens | 6 | Spherical surface | 8.172 | 3.277 | 2.003 | 28.3 |
|  | 7 | Spherical surface | 7.443 | 1.396 |  |  |
| Aperture stop | 8 | Spherical surface | — | 0.100 |  |  |
| Fourth lens | 9 | Spherical surface | 23.750 | 2.988 | 1.734 | 51.5 |
|  | 10 | Spherical surface | −5.814 | 0.103 |  |  |
| Fifth lens | 11 | Spherical surface | 8.257 | 4.925 | 1.593 | 68.5 |
| Sixth lens | 13 | Spherical surface | −5.349 | 0.800 | 1.762 | 26.6 |
|  | 14 | Spherical surface | 10.200 | 0.394 |  |  |
| Seventh lens | 15 | Aspherical surface | 9.055 | 2.759 | 1.628 | 63.3 |
|  | 16 | Aspherical surface | −9.612 | 0.30 |  |  |
| Optical filter | 17 | Spherical surface | — | 0.400 | 1.517 | 64.21 |
|  | 18 | Spherical surface | — | 2.639 |  |  |
| Flat Glass | 19 | Spherical surface | — | 0.50 | 1.517 | 64.21 |
|  | 20 | Spherical surface | — | 0.57 |  |  |
| Imaging surface | 21 | Spherical surface | — | — |  |  |

TABLE 2-2

| Surface number | K | B | C | D | E | F |
|---|---|---|---|---|---|---|
| 4 | 29.621 | 2.092e−3 | −2.541e−4 | 5.151e−6 | 2.253e−7 | −1.961e−8 |
| 5 | −0.542 | 4.912e−3 | −2.468e−4 | 6.888e−6 | −1.186e−7 | 1.932e−8 |
| 15 | 1.242 | −6.274e−4 | 6.758e−6 | −8.588e−7 | 5.150e−8 | −1.864e−9 |
| 16 | −0.466 | 8.965e−4 | −7.414e−6 | 1.311e−6 | −2.518e−8 | −2.906e−10 |

Figure 6:
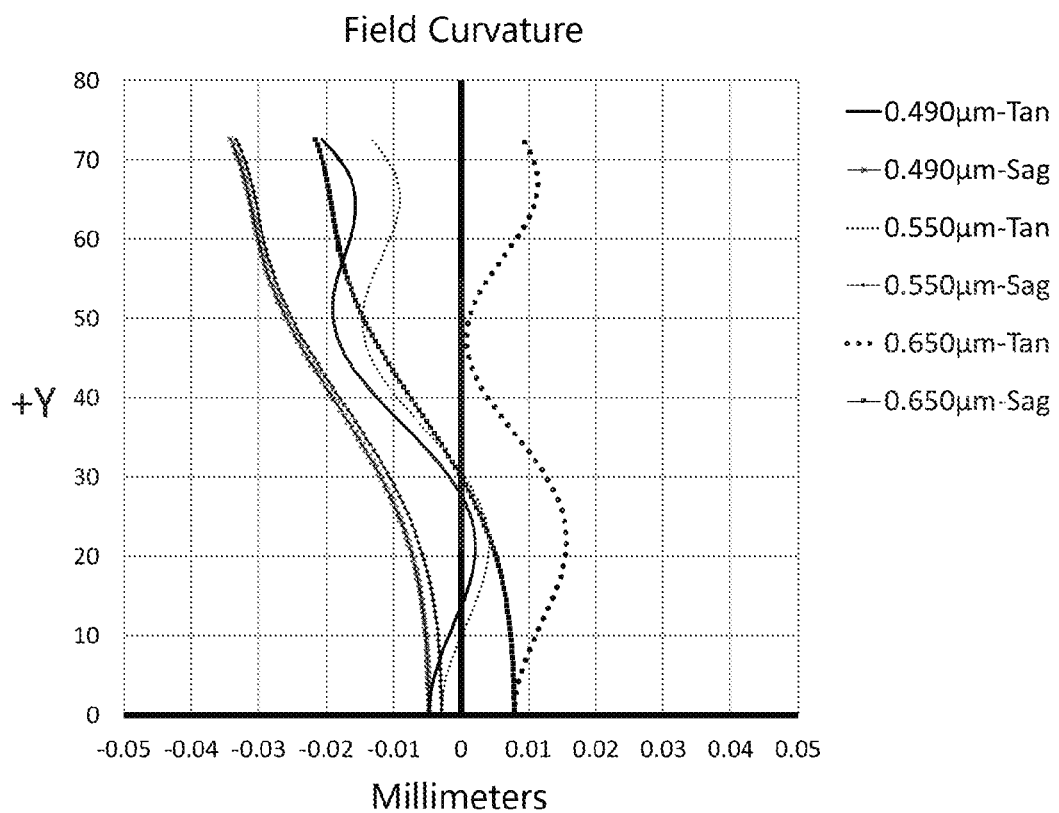
FIG. 6 is a curve diagram of a field curve of the wide-angle lens according to the second embodiment of the present disclosure.
Figure 7:
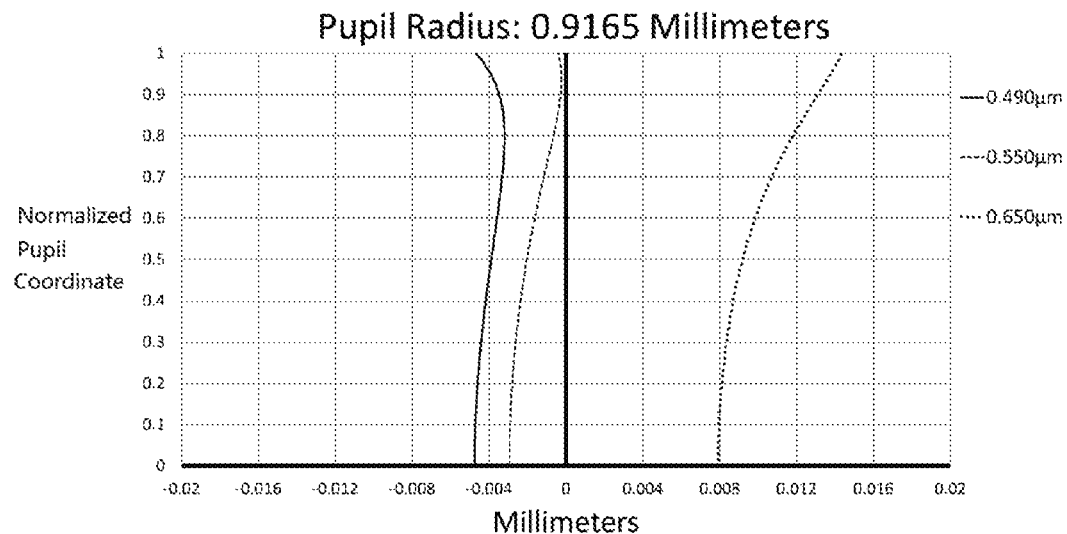
FIG. 7 is a curve diagram of axial aberration of the wide-angle lens according to the second embodiment of the present disclosure.
Figure 8:
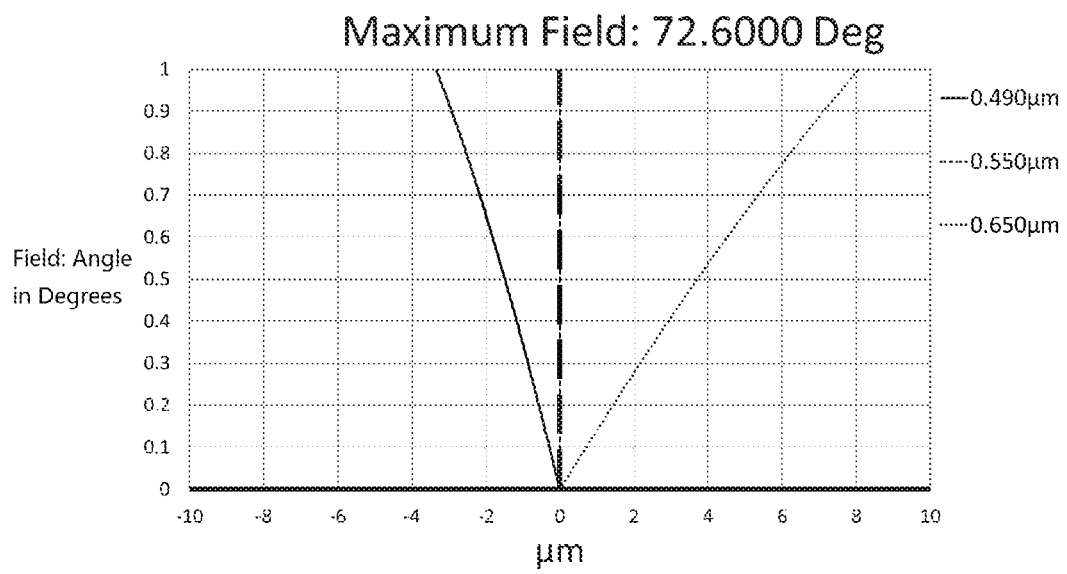
FIG. 8 is a curve diagram of vertical axis color difference of the wide-angle lens according to the second embodiment of the present disclosure.

In the embodiment, the field curve, the axial aberration and the vertical axis color difference of the wide-angle lens 100 are respectively shown in FIGS. 6, 7, and 8. It can be seen that the field curve is in the range of (−0.05, +0.05), the axial aberration is in the range of (−0.02,+0.02), and the vertical axis color difference is in the range of (−3.5,+10.0), which indicates that the field curve, the aberration, and the color difference is well corrected in the embodiment.

Embodiment 3

Figure 9:
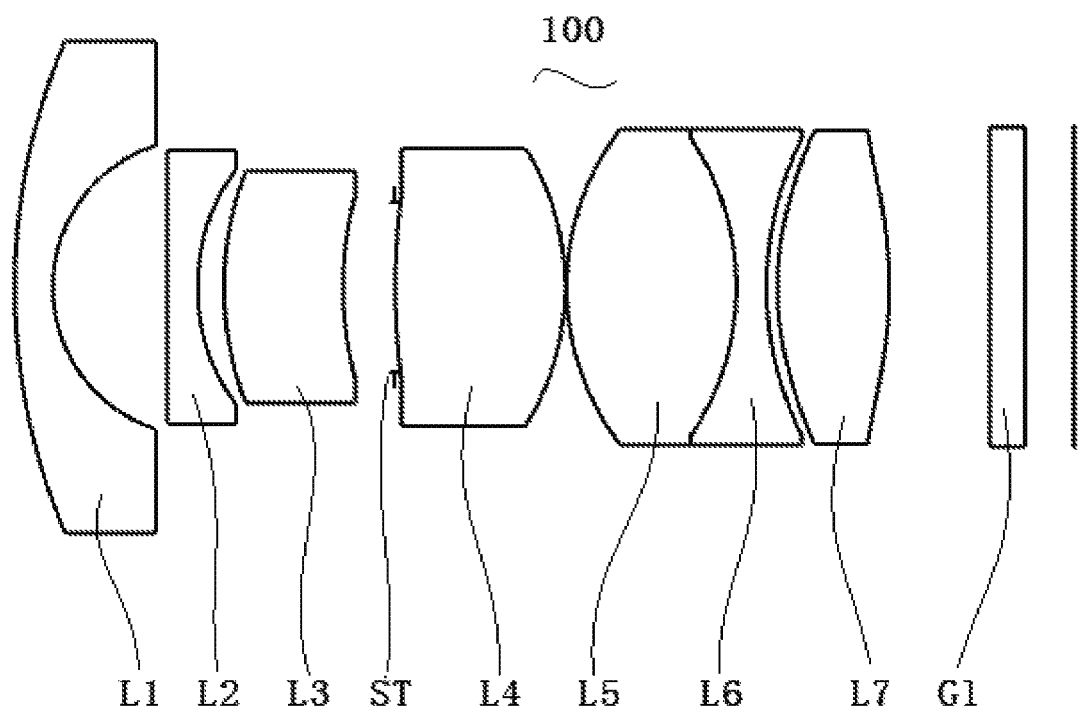
FIG. 9 is a schematic cross-sectional structural diagram of a wide-angle lens according to a third embodiment of the present disclosure.

Referring to FIG. 9, which is a structural diagram of the wide-angle lens 100 provided in a third embodiment of the present disclosure and is substantially the same as a structure of the lens of embodiment 2, except that the related parameters of each lens in the wide-angle lens of the embodiment are different, as shown in Table 3-1, and the parameters of each lens of spherical surfaces of one embodiment are shown in Table 3 -2.

TABLE 3-1

|  | Surface number | Surface type | Curvature radius-r | Thickness-d | Refractive index-Nd | Abbe number-Vd |
| --- | --- | --- | --- | --- | --- | --- |
| Subject to be shot | 1 | Spherical surface | — | Infinity |  |  |
| First lens | 2 | Spherical surface | 16.107 | 0.976 | 1.804 | 46.7 |
|  | 3 | Spherical surface | 3.846 | 2.934 |  |  |
| Second lens | 4 | Aspherical surface | −152.377 | 0.796 | 1.497 | 81.6 |
|  | 5 | Aspherical surface | 5.882 | 0.674 |  |  |
| Third lens | 6 | Spherical surface | 8.202 | 3.061 | 1.805 | 25.5 |
|  | 7 | Spherical surface | 8.890 | 1.317 |  |  |
| Aperture stop | 8 | Spherical surface | — | 0.032 |  |  |
| Fourth lens | 9 | Spherical surface | 18.463 | 4.362 | 1.741 | 52.7 |
|  | 10 | Spherical surface | −6.779 | 0.040 |  |  |
| Fifth lens | 11 | Spherical surface | 6.664 | 4.366 | 1.497 | 81.6 |
| Sixth lens | 13 | Spherical surface | −6.810 | 0.775 | 1.755 | 27.5 |
|  | 14 | Spherical surface | 8.499 | 0.278 |  |  |
| Seventh lens | 15 | Aspherical surface | 7.658 | 2.875 | 1.619 | 63.9 |
|  | 16 | Aspherical surface | −11.238 | 0.3 |  |  |
| Optical filter | 17 | Spherical surface | — | 0.400 | 1.517 | 64.21 |
|  | 18 | Spherical surface | — | 2.989 |  |  |
| Flat Glass | 19 | Spherical surface | — | 0.50 | 1.517 | 64.21 |
|  | 20 | Spherical surface | — | 0.57 |  |  |
| Imaging surface | 21 | Spherical surface | — | — |  |  |

TABLE 3-2

| Surface number | K | B | C | D | E | F |
|---|---|---|---|---|---|---|
| 4 | 0 | 2.222e−3 | −3.250e−4 | 2.465e−5 | −1.110e−6 | 1.905e−8 |
| 5 | 0.617 | 3.190e−3 | −3.970e−4 | 3.033e−5 | −9.737e−7 | −7.679e−9 |
| 15 | 0.403 | −9.900e−4 | 4.412e−6 | −5.675e−7 | 3.958e−8 | 3.211e−10 |
| 16 | 1.822 | 6.820e−4 | −3.345e−6 | 1.520e−6 | −8.079e−8 | 3.840e−9 |

Figure 10:
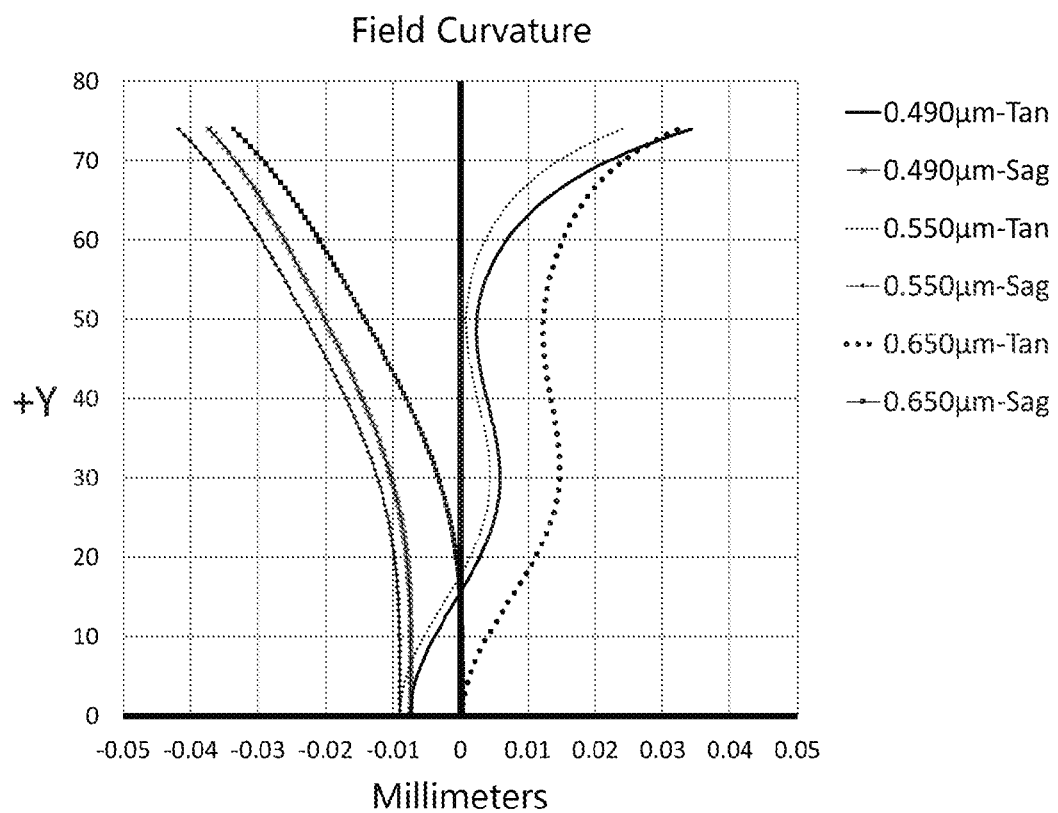
FIG. 10 is a curve diagram of a field curve of the wide-angle lens according to the third embodiment of the present disclosure.
Figure 11:
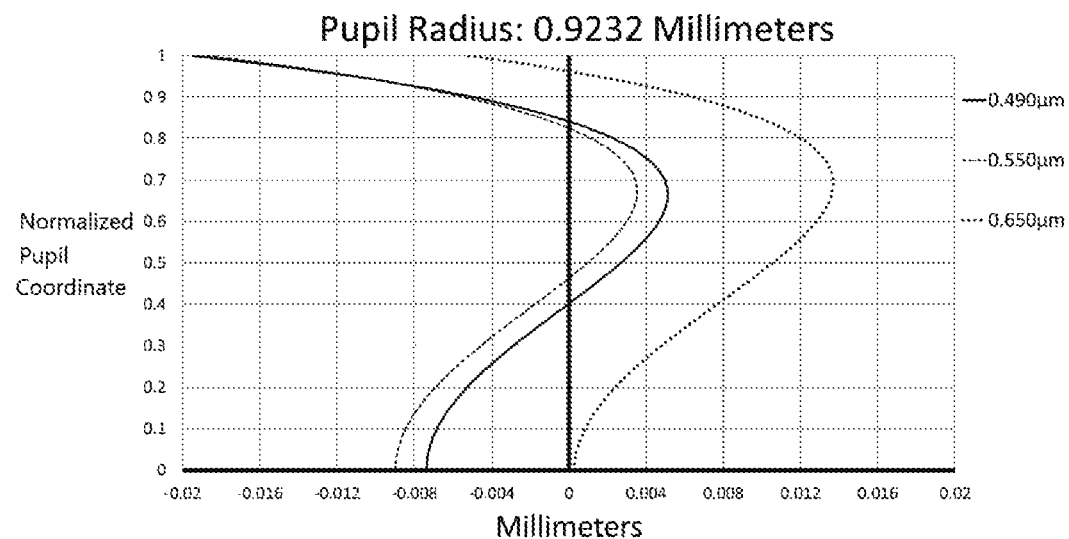
FIG. 11 is a curve diagram of axial aberration of the wide-angle lens according to the third embodiment of the present disclosure.
Figure 12:
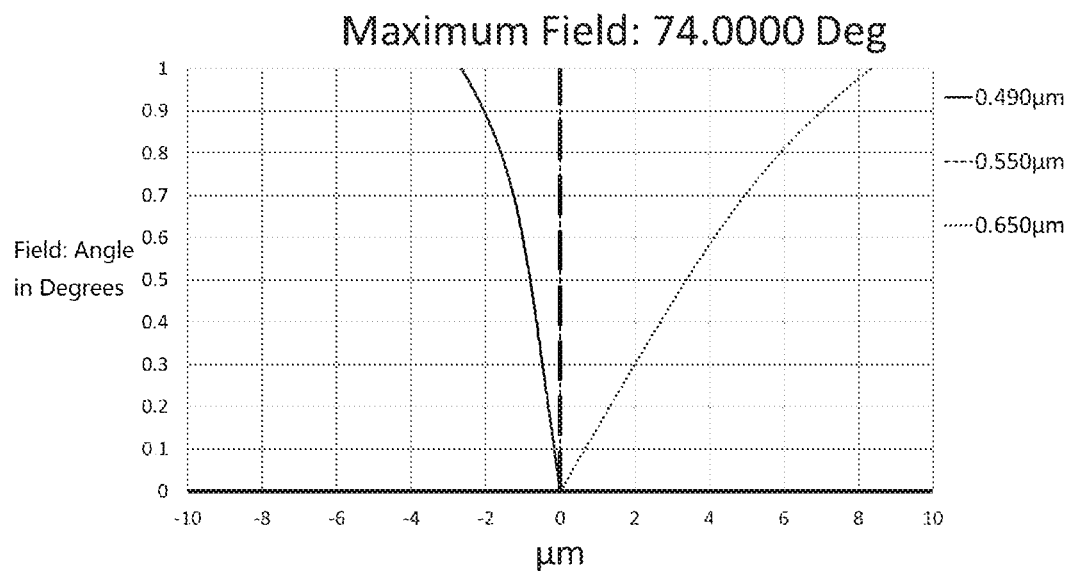
FIG. 12 is a curve diagram of vertical axis color difference of the wide-angle lens according to the third embodiment of the present disclosure.

In the embodiment, the field curve, the axial aberration and the vertical axis color difference of the wide-angle lens 100 are respectively shown in FIGS. 10, 11, and 12. It can be seen that the field curve is in the range of (−0.05, +0.05), the axial aberration is in the range of (−0.02,+0.02), and the vertical axis color difference is in the range of (−3.5,+10.0), which indicates that the field curve, the aberration, and the color difference is well corrected in the embodiment.

Embodiment 4

Figure 13:
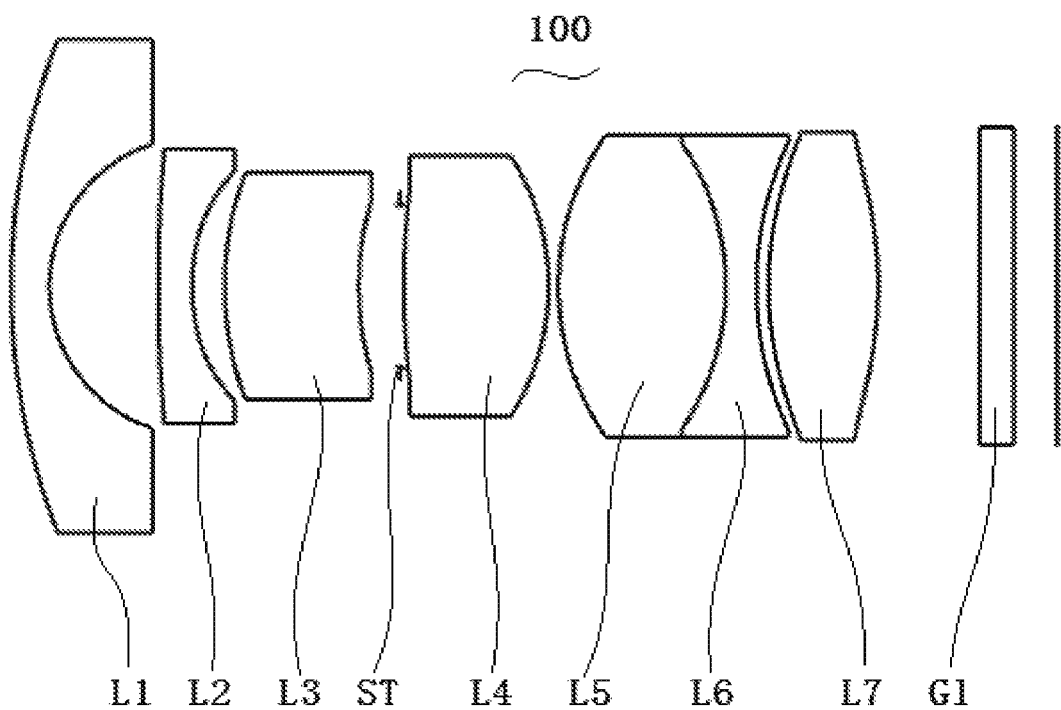
FIG. 13 is a schematic cross-sectional structural diagram of a wide-angle lens according to a fourth embodiment of the present disclosure.

Referring to FIG. 13, which is a structural diagram of the wide-angle lens 100 provided in a fourth embodiment of the present disclosure and is substantially the same as a structure of the lens of embodiment 3, except that the related parameters of each lens in the wide-angle lens of the embodiment are different, as shown in Table 4-1, and the parameters of each lens of spherical surfaces of one embodiment are shown in Table 4 -2.

TABLE 4-1

| | Surface number | Surface type | Curvature radius-r | Thickness-d | Refractive index-Nd | Abbe number-Vd |
|---|---|---|---|---|---|---|
| Subject to be shot | 1 | Spherical surface | — | Infinity | | |
| First lens | 2 | Spherical surface | 17.480 | 0.985 | 1.804 | 46.7 |
| | 3 | Spherical surface | 3.871 | 2.823 | | |
| Second lens | 4 | Aspherical surface | 1914.498 | 0.857 | 1.433 | 94.8 |
| | 5 | Aspherical surface | 5.484 | 0.844 | | |
| Third lens | 6 | Spherical surface | 8.248 | 3.466 | 1.805 | 75.5 |
| | 7 | Spherical surface | 7.851 | 1.066 | | |
| Aperture stop | 8 | Spherical surface | — | 0.089 | | |
| Fourth lens | 9 | Spherical surface | 18.665 | 3.745 | 1.741 | 52.7 |
| | 10 | Spherical surface | −6.237 | 0.252 | | |
| Fifth lens | 11 | Spherical surface | 6.799 | 4.319 | 1.497 | 81.6 |
| Sixth lens | 13 | Spherical surface | −6.592 | 0.794 | 1.755 | 27.5 |
| | 14 | Spherical surface | 8.827 | 0.307 | | |
| Seventh lens | 15 | Aspherical surface | 8.463 | 2.839 | 1.628 | 63.3 |
| | 16 | Aspherical surface | −10.148 | 0.3 | | |
| Optical filter | 17 | Spherical surface | — | 0.400 | 1.517 | 64.21 |
| | 18 | Spherical surface | — | 2.862 | | |
| Flat Glass | 19 | Spherical surface | — | 0.50 | 1.517 | 64.21 |
| | 20 | Spherical surface | — | 0.57 | | |
| Imaging surface | 21 | Spherical surface | — | — | | |

TABLE 4-2

| Surface Number | K | B | C | D | E | F |
|---|---|---|---|---|---|---|
| 4 | 0 | 2.961e−3 | −3.473e−4 | 2.525e−5 | −1.132e−6 | 2.093e−8 |
| 5 | 0.948 | 3.809e−3 | −4.033e−4 | 2.708e−5 | −7.795e−7 | −2.784e−8 |
| 15 | 0.793 | −9.040e−4 | 4.983e−6 | −1.003e−7 | 3.506e−3 | −3.226e−10 |
| 16 | 1.815 | 6.896e−4 | 3.467e−6 | 1.584e−6 | −6.479e−8 | 3.664e−9 |

Figure 14:
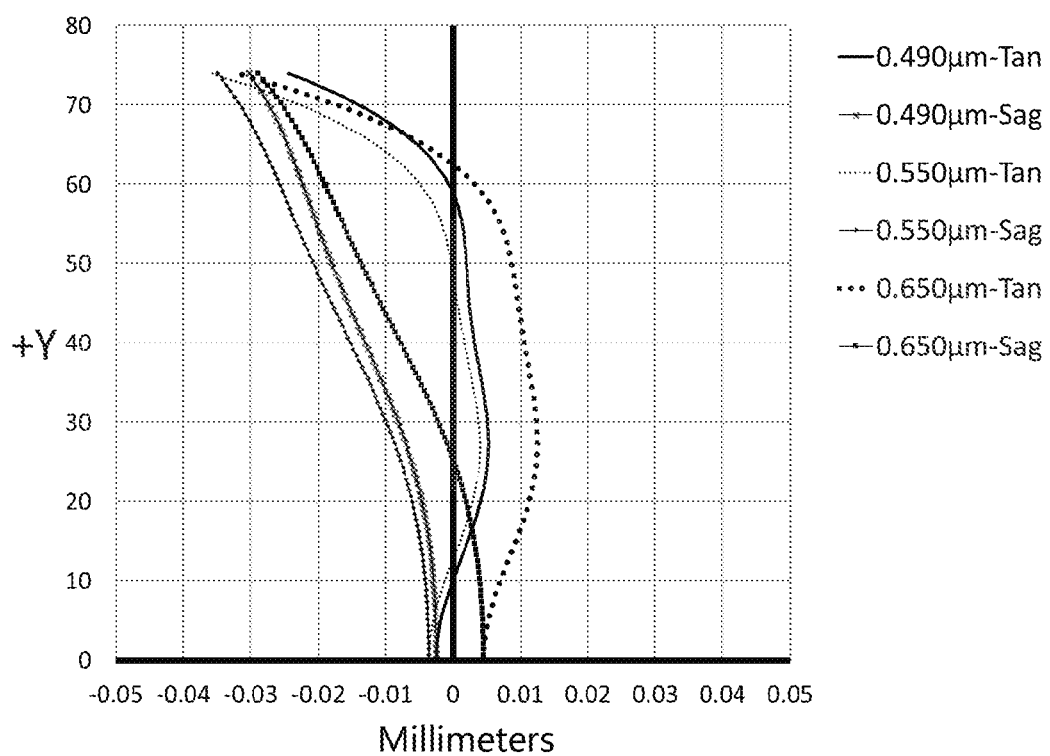
FIG. 14 is a curve diagram of a field curve of the wide-angle lens according to the fourth embodiment of the present disclosure.
Figure 15:
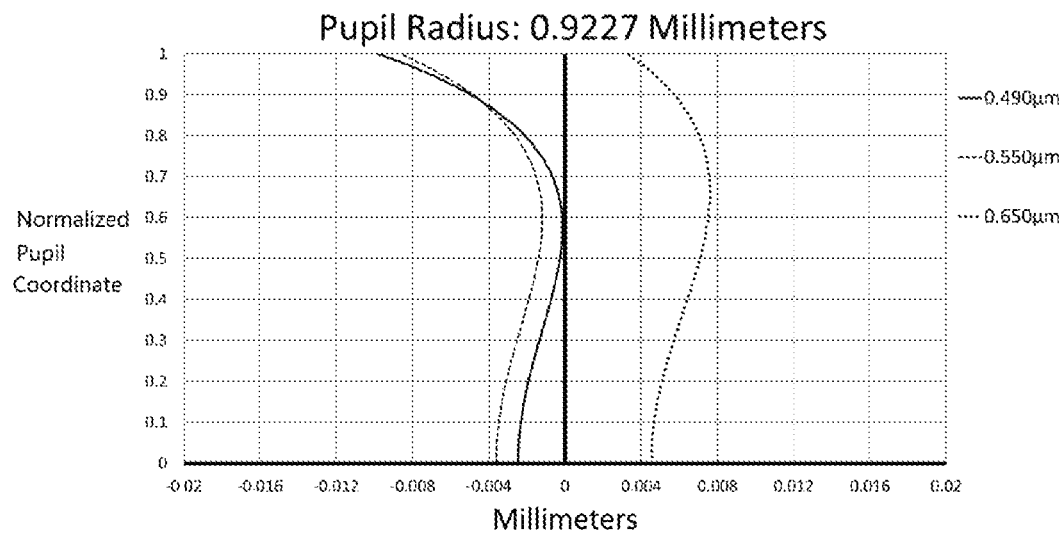
FIG. 15 is a curve diagram of axial aberration of the wide-angle lens according to the fourth embodiment of the present disclosure.
Figure 16:
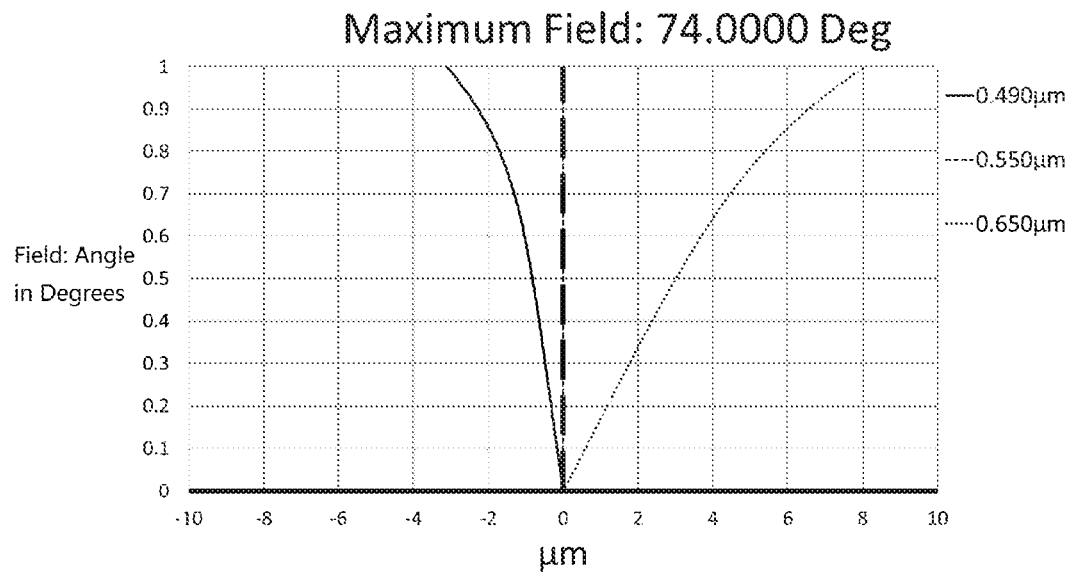
FIG. 16 a curve diagram of vertical axis color difference of the wide-angle lens according to the fourth embodiment of the present disclosure.

In the embodiment, the field curve, the axial aberration and the vertical axis color difference of the wide-angle lens 100 are respectively shown in FIGS. 14, 15, and 16. It can be seen that the field curve is in the range of (−0.05, +0.05), the axial aberration is in the range of (−0.02,+0.02), and the vertical axis color difference is in the range of (−3.5,4-10.0), which indicates that the field curve, the aberration, and the color difference is well corrected in the embodiment.

Table 5 is obtained by summarizing the four embodiments described above, The Table 5 shows the above four embodiments and their corresponding optical characteristics, where the optical characteristic includes system focal length F, aperture number F#, field angle $2^\theta$, and total system length $T_L$, and values corresponding to each previous expression.

TABLE 5

| Embodiment | Embodiment 1 | Embodiment 2 | Embodiment 3 | Embodiment 4 |
|---|---|---|---|---|
| f (mm) | 3.31 | 3.30 | 3.32 | 3.32 |
| F# | 1.8 | 1.8 | 1.8 | 1.8 |
| 2 θ | 146° | 145° | 148° | 146° |
| $T_L$ (mm) | 27.0 | 26.4 | 27.2 | 27.0 |
| $\varphi_2/\varphi_7$ | −0.825 | −0.617 | −0.687 | −0.614 |
| $(dN/dT)_5 + (dN/dT)_6$ | −5.4 | −5.4 | −4.9 | −4.9 |
| $(dN/dT)_2 + (dN/dT)_7$ | −15.2 | −8.7 | −8.4 | −8.5 |
| $\varphi_5/\varphi_6$ | −0.209 | −0.430 | −0.343 | −0.327 |
| $\varphi_{II}/\varphi$ | 0.444 | 0.615 | 0.595 | 0.605 |
| IH/(f*θ) | 0.970 | 0.969 | 0.962 | 0.965 |
| $T_5/T_7$ | 1.008 | 1.785 | 1.519 | 1.521 |
| $R_9/R_{10}$ | −7.876 | −4.085 | −2.724 | −2.993 |

According to Table 5, the total optical length of the wide-angle lens 100 is less than 28 mm, the aperture number F# of the wide-angle lens 100 is 1.8, and the field angle $2^\theta$ of the wide-angle lens 100 is in the range of 145°~148°.

Based on above, in specific processes, the wide-angle lens 100 satisfies the following expression: $-0.85 < \varphi_2/\varphi_7 < -0.6$, wherein $\varphi_2$ represents a refractive power of the second lens L2, and $\varphi_7$ represents a refractive power of the seventh lens L7. The expression indicates that spherical aberration formed by the second lens L2 and the seventh lens L7 cancel each other, which is able to effectively improve an analysis force of the wide-angle lens 100.

Furthermore, the wide-angle lens 100 satisfies the following expression: $-5.5 < (dN/dT)_5 + (dN/dT)_6 < -4,5$, wherein $(dN/dT)_5$ represents a temperature coefficient of a refractive index of the fifth lens L5, and $(dN/dT)_6$ represents a temperature coefficient of a refractive index of the sixth lens L6. The expression indicates that the fifth lens L5 and the sixth lens L6 effectively compensate influences of temperature changes on a focal length of the wide-angle lens 100, which further improves stability of the analysis force of the wide-angle lens 100 at different temperatures.

Furthermore, the wide-angle lens 100 satisfies the following expression: $-15.5 < (dN/dT)_2 + (dN/dT)_7 < -8.0$, wherein $(dN/dT)_2$ represents a temperature coefficient of refractive index of the second lens L2, and $(dN/dT)_7$ represents a temperature coefficient of a refractive index of the seventh lens L7. When this expression is satisfied, sensitivity of the wide-angle lens 100 to the temperature is effectively reduced, and the stability of the analysis force of the wide-angle lens 100 at different temperatures is further improved.

Furthermore, the wide-angle lens 100 satisfies the following expression: $-0.45 < \varphi_5/\varphi_6 < -0.2$. wherein $\varphi_5$ represents a refractive power of the fifth lens L5, and φ6 represents a refractive power of the sixth lens L6. When this expression is satisfied, color difference of the wide-angle lens 100 can be effectively corrected, and the analysis force of the wide-angle lens 100 is further improved.

Furthermore, the wide-angle lens 100 satisfies the following expression: $-0.63 < \varphi_{II}/\varphi < -0.42$, wherein $\varphi_{II}$ represents a combined refractive power of the second lens group, and φ represents a refractive power of the wide-angle lens 100. When this expression is satisfied, astigmatism of the wide-angle lens 100 can be effectively corrected, and the analysis force of the wide-angle lens 100 is further improved.

Furthermore, the wide-angle lens satisfies the following expression: $0.95 < |IH/(f*\theta)| < 1$, wherein θ represents a maximum half-field angle of the wide-angle lens 100 (representing as radians), IH represents an image height of the wide-angle lens when the half field angle is θ, and f represents an effective focal length of the wide-angle lens 100. This expression indicates radio of an actual image height of the wide-angle lens 100 to an ideal image height of the wide-angle lens.

Furthermore, the wide-angle lens satisfies the following expressions: $D_1 > D_2 > D_3$, where $D_1$ represents the maximum diameter of the first lens, $D_2$ represents the maximum diameter of the second lens, $D_3$ represents the maximum diameter of the third lens.

Furthermore, the wide-angle lens satisfies the following expression: $1 < T_5/T_7 < 2$, wherein $T_5$ represents the thickness of the fifth lens, $T_7$ represents the thickness of the seventh lens.

Furthermore, the wide-angle lens satisfies the following expressions: $d_{12} > d_{34} > d_{67}$, wherein $d_{12}$ represents the distance between the first lens and the second lens on the optical axis, $d_{34}$ represents the distance between the third lens and the fourth lens on the optical axis, $d_{67}$ represents the distance between the sixth lens and the seventh lens on the optical axis.

Furthermore, the wide-angle lens satisfies the following expression: $-8 < R_9/R_{10} < -2$, wherein $R_9$ represents a radius of curvature of an object side surface of the fourth lens, Rio represents a radius of curvature of an image side surface of the fourth lens.

Furthermore, the wide-angle lens satisfies the following expression: $0.3 < R_3/R_5 < 1$, wherein $R_3$ represents a radius of curvature of an image side surface of the first lens, $R_5$ represents a radius of curvature of an image side surface of the second lens.

Furthermore, the wide-angle lens satisfies the following expression: $3<R_2/R_3<5$, wherein $R_2$ represents a radius of curvature of an object side surface of the first lens, $R_3$ represents a radius of curvature of an image side surface of the first lens.

According o above structural parameters, the wide-angle lens 100 of the present disclosure at least has following advantages:

(1) The wide-angle lens adopts seven glass lenses, which is clearly imaged in the temperature range of −40° C. to +85° C. and is particularly suitable for camera fields such as motion cameras, vehicle-mounted cameras, which are used in a harsh environment.

(2) The wide-angle lens is clearly imaged through reasonable configuration of focal power combinations between the lenses, which can match with imaging chips with more than eight million pixels.

(3) A field angle of the wide-angle lens can reach 146 degrees, distortion of f-θ is effectively corrected, and the distortion of f-θ is controlled to be less than 5%. Thus, requirements of a large field angle are satisfied.

(4) An aperture number of the wide-angle lens is 1.8, which satisfies an imaging requirement of a darker environment.

The above-mentioned embodiments merely illustrate several embodiments of the present disclosure, and the description thereof is specific and detailed, which cannot to be understood as a limit to the disclosed embodiments. It should be noted that a number of variations and modifications may be made by person skilled in the art without departing from the spirit and scope of the present disclosure. The scope of the present disclosure should be determined by the appended claims.

What is claimed is:

1. A wide-angle lens, from an object side to an imaging surface, comprising a first lens group having a negative focal power, a second lens group having a positive focal power, and an aperture stop disposed between the first lens group and the second lens group; wherein the first lens group, from the object side to the imaging surface, sequentially comprises a meniscus-shaped first lens having a negative focal power, a second lens having a negative focal power, and a third lens having a positive focal power; a concave surface of the first lens faces the imaging surface, and a concave surface of the second lens faces the imaging surface the second lens group, from the object side to the imaging surface, sequentially comprises a fourth lens having a positive focal power, a fifth lens having a positive focal power, a sixth lens having a negative focal power, and a seventh lens having a positive focal power; the fourth lens, the fifth lens, and the seventh lens are biconvex lenses; and the sixth lens is a biconcave lens;

the fifth lens and the sixth lens cemented a cemented lens; and the first lens, the third lens, the fourth lens, the fifth lens, and the sixth lens are glass spherical lenses; the second lens and the seventh lens are glass aspherical lenses; and optical center bits of the lenses in the first lens group and the second lens group are located on a same straight line wherein the wide-angle lens satisfies the following expression: $-0.85 < \varphi_2/\varphi_7 < -0.6$; wherein $\varphi_2$ represents a refractive power of the second lens, and $\varphi_7$ represents a refractive power of the seventh lens.

2. The wide-angle lens according to claim 1, wherein the wide-angle lens satisfies the following expression: $-5.5 \times 10^{-6}/K < (dN/dT)_5 + (dN/dT)_6 < -4.5 \times 10^{-6}/K$; wherein $(dN/dT)_5$ represents a temperature coefficient of a refractive index of the fifth lens, and $(dN/dT)_6$ represents a temperature coefficient of a refractive index of the sixth lens.

3. The wide-angle lens according to claim 1, wherein the wide-angle lens satisfies the following expression: $-15.5 \times 10^{-6}/K < (dN/dT)_2 + (dN/dT)_7 < -8.0 \times 10^{-6}/K$; wherein $(dN/dT)_2$ represents a temperature coefficient of a refractive index of the second lens, and $(dN/dT)_7$ represents a temperature coefficient of a refractive index of the seventh lens.

4. The wide-angle lens according to claim 1, wherein the wide-angle lens satisfies the following expression: $-0.45 < \varphi_5/\varphi_6 - 0.2$; wherein $\varphi_5$ represents a refractive power of the fifth lens, and $\varphi_6$ represents a refractive power of the sixth lens.

5. The wide-angle lens according to claim 1, wherein the wide-angle lens satisfies the following expression: $0.63 < \varphi_{II}/\varphi < 0.42$; wherein $\varphi_{II}$ represents a combined refractive power of the second lens group, and $\varphi$ represents a refractive power of the wide-angle lens.

6. The wide-angle lens according to claim 1, wherein the wide-angle lens satisfies the following expression: $0.95 < |IH/(f*\theta)| < 1$; wherein $\theta$ represents a maximum half-field angle of the wide-angle lens, IH represents an image height of the wide-angle lens when the half field angle is $\theta$, and f represents an effective focal length of the wide-angle lens.

7. The wide-angle lens according to claim 1, wherein surface shapes of the second lens and the seventh lens satisfy the following formula:

$$z = \frac{ch^2}{1+\sqrt{1-(1+K)c^2h^2}} + Bh^4 + Ch^6 + Dh^8 + Eh^{10} + Fh^{12};$$

wherein z represents a distance of a curved surface of the second lens or the seventh lens leaving away from a vertex of the curved surface in optical axis direction, c represents a curvature of the vertex of the curved surface, K represents a quadratic surface coefficient, h represents a distance from the optical axis to the curved surface, B, C, D, E, and F respectively represent a fourth order curve coefficient, a sixth order curve coefficient, an eighth order curve coefficient, a tenth order curve coefficient, and a twelfth order curve coefficient.

8. The wide-angle lens according to claim 1, wherein the wide-angle lens satisfies the following expressions: $D_1 > D_2 > D_3$, where $D_1$ represents the maximum diameter of the first lens, $D_2$ represents the maximum diameter of the second lens, $D_3$ represents the maximum diameter of the third lens.

9. The wide-angle lens according to claim 1, wherein the wide-angle lens satisfies the following expression: $1 < T_5/T_7 < 2$, wherein $T_5$ represents the thickness of the fifth lens, $T_7$ represents the thickness of the seventh lens.

10. The wide-angle lens according to claim 1, wherein the wide-angle lens satisfies the following expressions: $d_{12} > d_{34} > d_{67}$, wherein $d_{12}$ represents the distance between the first lens and the second lens on the optical axis, $d_{34}$ represents the distance between the third lens and the fourth lens on the optical axis, $d_{67}$ represents the distance between the sixth lens and the seventh lens on the optical axis.

11. The wide-angle lens according to claim 1, wherein the wide-angle lens satisfies the following expression: $-8 < R_9/$ $R_{10} < -2$, wherein $R_9$ represents a radius of curvature of an object side surface of the fourth lens, $R_{10}$ represents a radius of curvature of an image side surface of the fourth lens.

12. The wide-angle lens according to claim 1, wherein the wide-angle lens satisfies the following expression: $0.3 < R_3/R_5 < 1$, wherein $R_3$ represents a radius of curvature of an image side surface of the first lens, $R_5$ represents a radius of curvature of an image side surface of the second lens.

13. The wide-angle lens according to claim 1, wherein the wide-angle lens satisfies the following expression: $3 < R_2/R_3 < 5$, wherein $R_2$ represents a radius of curvature of an object side surface of the first lens, $R_3$ represents a radius of curvature of an image side surface of the first lens.

14. A wide-angle lens, from an object side to an imaging surface, comprising a first lens group having a negative focal power, a second lens group having a positive focal power, and an aperture stop disposed between the first lens group and the second lens group; wherein the first lens group, from the object side to the imaging surface, sequentially comprises a meniscus-shaped first lens having a negative focal power, a second lens having a negative focal power, and a third lens having a positive focal power; a concave surface of the first lens faces the imaging surface, and a concave surface of the second lens faces the imaging surface the second lens group, from the object side to the imaging surface, sequentially comprises a fourth lens having a positive focal power, a fifth lens having a positive focal power, a sixth lens having a negative focal power, and a seventh lens having a positive focal power; the fourth lens, the fifth lens, and the seventh lens are biconvex lenses; and the sixth lens is a biconcave lens;

the fifth lens and the sixth lens cemented a cemented lens; and the first lens, the third lens, the fourth lens, the fifth lens, and the sixth lens are glass spherical lenses; the second lens and the seventh lens are glass aspherical lenses; and optical center bits of the lenses in the first lens group and the second lens group are located on a same straight line;

wherein the wide-angle lens satisfies the following expression: $-0.45 < \varphi_5/\varphi_6 < -0.2$; wherein $\varphi_5$ represents a refractive power of the fifth lens, and $\varphi_6$ represents a refractive power of the sixth lens.

15. A wide-angle lens, from an object side to an imaging surface, comprising a first lens group having a negative focal power, a second lens group having a positive focal power, and an aperture stop disposed between the first lens group and the second lens group; wherein the first lens group, from the object side to the imaging surface, sequentially comprises a meniscus-shaped first lens having a negative focal power, a second lens having a negative focal power, and a third lens having a positive focal power; a concave surface of the first lens faces the imaging surface, and a concave surface of the second lens faces the imaging surface the second lens group, from the object side to the imaging surface, sequentially comprises a fourth lens having a positive focal power, a fifth lens having a positive focal power, a sixth lens having a negative focal power, and a seventh lens having a positive focal power; the fourth lens, the fifth lens, and the seventh lens are biconvex lenses; and the sixth lens is a biconcave lens;

the fifth lens and the sixth lens cemented a cemented lens; and the first lens, the third lens, the fourth lens, the fifth lens, and the sixth lens are glass spherical lenses; the second lens and the seventh lens are glass aspherical lenses; and optical center bits of the lenses in the first lens group and the second lens group are located on a same straight line;

wherein the wide-angle lens satisfies the following expression: $0.95 < |IH/(f*\theta)| < 1$;

wherein $\theta$ represents a maximum half-field angle of the wide-angle lens, IH represents an image height of the wide-angle lens when the half field angle is $\theta$, and f represents an effective focal length of the wide-angle lens.

* * * * *